(12) United States Patent
Terörde

(10) Patent No.: US 8,143,833 B2
(45) Date of Patent: Mar. 27, 2012

(54) PROCESSING UNIT

(75) Inventor: Gerd Terörde, Hamminkeln (DE)

(73) Assignee: Atlas Copco Airpower N.V., Antwerpen-Wilrijk (BE)

( * ) Notice: Subject to any disclaimer, the term of this patent is extended or adjusted under 35 U.S.C. 154(b) by 629 days.

(21) Appl. No.: 11/997,393

(22) PCT Filed: Aug. 2, 2006

(86) PCT No.: PCT/IB2006/002495
§ 371 (c)(1),
(2), (4) Date: Jul. 15, 2008

(87) PCT Pub. No.: WO2007/063366
PCT Pub. Date: Jun. 7, 2007

(65) Prior Publication Data
US 2009/0160387 A1 Jun. 25, 2009

(30) Foreign Application Priority Data
Aug. 2, 2005 (NL) ..................................... 1029659

(51) Int. Cl.
*H02P 1/04* (2006.01)
(52) U.S. Cl. ........ 318/474; 318/567; 318/569; 700/276; 702/182; 702/184
(58) Field of Classification Search .................. 318/474, 318/567, 569, 568.12, 568.13; 62/127, 153, 62/12.02, 298; 454/61, 67; 700/278, 276; 702/182, 184
See application file for complete search history.

(56) References Cited

U.S. PATENT DOCUMENTS

| | | | |
|---|---|---|---|
| 4,742,475 A * | 5/1988 | Kaiser et al. | 700/278 |
| 4,841,207 A | 6/1989 | Cheyne | |
| 4,916,642 A * | 4/1990 | Kaiser et al. | 700/278 |
| 5,581,452 A | 12/1996 | Yamamoto | |
| 5,810,657 A * | 9/1998 | Pariseau | 454/61 |
| 5,951,394 A * | 9/1999 | Pariseau | 454/61 |
| 6,434,512 B1 * | 8/2002 | Discenzo | 702/184 |
| 6,700,356 B1 * | 3/2004 | Dorn | 322/44 |
| 6,739,145 B2 * | 5/2004 | Bhatnagar | 62/127 |
| 6,757,665 B1 * | 6/2004 | Unsworth et al. | 706/15 |
| 6,842,718 B2 * | 1/2005 | Byrd et al. | 702/182 |

(Continued)

FOREIGN PATENT DOCUMENTS
EP 0290 890 11/1988
(Continued)

OTHER PUBLICATIONS
Hong-Seok Song et al., "Advanced control scheme for a single-phase PWM rectifier in traction applications", 2003, IEEE, pp. 1558-1565.

(Continued)

*Primary Examiner* — Paul Ip
(74) *Attorney, Agent, or Firm* — Swanson & Bratschun, L.L.C.

(57) ABSTRACT

The invention relates to a processing unit of a measuring signal related to conditions of an object controlled by power electronics. The processing unit comprises an interface with digital terminals, wherein the interface is provided with at least one terminal for a sensor which generates the measuring signal. Further, the processing unit comprises a calculating unit to which the interface is connected. The calculating unit is equipped with a real-time control system. In addition, the calculating unit comprises a general-purpose processor.

10 Claims, 4 Drawing Sheets

U.S. PATENT DOCUMENTS

| | | |
|---|---|---|
| 7,099,852 B2 * | 8/2006 | Unsworth et al. .............. 706/23 |
| 7,166,982 B2 * | 1/2007 | Takahashi et al. ....... 318/568.13 |
| 7,389,278 B2 * | 6/2008 | Unsworth et al. .............. 706/23 |
| 7,586,282 B2 * | 9/2009 | Takahashi et al. ....... 318/568.13 |
| 2001/0039190 A1 * | 11/2001 | Bhatnagar .................... 455/450 |
| 2004/0131342 A1 | 7/2004 | Masino |
| 2004/0158428 A1 * | 8/2004 | Byrd et al. ................... 702/182 |
| 2004/0199480 A1 * | 10/2004 | Unsworth et al. .............. 706/16 |
| 2005/0068001 A1 | 3/2005 | Skaugh et al. |
| 2005/0093501 A1 * | 5/2005 | Takahashi et al. ....... 318/568.13 |

FOREIGN PATENT DOCUMENTS

| | | |
|---|---|---|
| EP | 0 734 115 A1 | 9/1996 |
| EP | 0 734 115 B1 | 6/1999 |
| EP | 0812753 | 7/2001 |
| JP | 61-076093 | 4/1986 |
| JP | 63-287393 | 11/1988 |
| JP | 08-317658 | 11/1996 |
| JP | 09-182493 | 7/1997 |
| JP | 11-134016 | 5/1999 |
| JP | 2003-9570 | 1/2003 |
| JP | 2005-245126 | 9/2005 |
| KR | 20-0222587 | 5/2001 |

OTHER PUBLICATIONS

English Translation of Korean Office Action dated Jun. 16, 2011 for corresponding Korean Patent Application No. 10-2008-7003449.
English Translation of Chinese Office Action dated Jul. 26, 2011 for corresponding Chinese Patent Application No. 200680028383.7.

* cited by examiner

PROCESSING UNIT

RELATED APPLICATIONS

This application is a 35 U.S.C. §371 national phase application of PCT/IB2006/002495 (WO 2007/063366), filed on Aug. 2, 2006, entitled "Processing Unit", which application claims the benefit of Netherlands Application Serial No. NL 1029659, filed Aug. 2, 2005, each of which is incorporated herein by reference in its entirety.

The invention relates to a processing unit for processing a measuring signal related to conditions of an object controlled by power electronics, comprising an interface with digital terminals, wherein the interface is provided with at least one terminal for a sensor which generates the measuring signal, further comprising a calculating unit to which the interface is connected, wherein the calculating unit is equipped with a real-time control system.

Such a processing unit is, for instance, known as measuring equipment for processing and representing a measuring signal related to operating conditions of an AC motor which drives a compressor with high power. A measuring signal generated by a current sensor during operation of the motor for instance represents the electric current in a winding of the motor. The interface digitizes the analogous measuring signal and feeds it to the calculating unit. In the known processing unit, the calculating unit is designed as a digital signal processor (DSP), so that the digitized signal can be processed further, for instance for representation, storage and/or calculations. Since the calculating unit is equipped with a real-time control system, the measuring signal can be processed in real time.

Digital signal processors are excellently suitable for real-time processing of digital signals, inter alia because of proven reliability, favorable energetic-properties and low cost price. For real-time processing of a measuring signal related to operating conditions of an AC motor which drives a compressor with a relatively high nominal rotational speed, such as a turbo compressor, the calculating capacity of current DSPs may be inadequate, however. This is because the number of processing steps which a DSP can carry out within a sampling cycle of the measuring signal decreases as the sampling frequency of the measuring signal increases. Usually, the sampling frequency of the measuring signal is chosen in proportion to the frequency of a control signal of the AC motor. The frequency of the control signal is often higher as the rotational speed of the AC motor increases, so that the relatively high fundamental frequencies of the AC motor can be processed.

It is an object of the invention to obtain a processing unit according to the introductory portion of claim 1, where the above-mentioned drawback is obviated. In particular, it is an object of the invention to obtain a processing unit for processing a measuring signal related to conditions of an object controlled by power electronics, while, with a relatively high nominal rotational speed of the electric machine and a high sampling frequency desired with this, the processing unit can still carry out a relatively high number of processing steps in real time for processing relatively high fundamental frequencies of the electric machine. To this end, the calculating unit comprises general-purpose equipment.

Although, due to lower reliability, higher energy consumption and relatively high cost price, a general-purpose processor would not be eligible for use in a processing unit for processing measuring signals of objects controlled by power electronics, application of a general-purpose processor does result in a larger calculating capacity, however, in particular with regard to floating point operations, so that, with a relatively high rotational speed of the AC motor, still a relatively high number of processing steps can be carried out on the digitized measuring signal in real time.

In addition, by use of a general-purpose processor, a platform is obtained on which standard software can be installed, for instance for programming the processing steps. In addition, compiled programs of specific algorithms can be combined without release of source codes, for instance for testing purposes. In addition, the processing unit can relatively easily be arranged for exchanging data with other equipment, for instance for downloading software code, obtaining measurement data, storing data, adjusting parameters, etcetera. Further, the processing unit can be built into an existing PC or be designed as a stand-alone unit.

By arranging the processing unit such that, depending on the measuring signal, the unit generates a control signal for regulating the object controlled by the power electronics, in an advantageous manner, a processing unit is obtained which can also be used for regulating, for instance, an AC motor of a compressor with a relatively high rotational speed, such as a turbo compressor. This is because, for regulating an AC motor, a minimum number of processing steps of the measuring signal are required. By use of the general-purpose processor, these processing steps can be carried out within the sampling cycle of the measuring signal, so that regulating compressors with relatively high rotational speeds is possible, unlike the known processing unit which is designed with a currently available DSP.

In an advantageous manner, the processing unit can be used for processing a measuring signal related to an electric machine with a high nominal power which is controlled by power electronics. This makes it possible to also process measuring signals of electric machines with high nominal power, for instance with a power of more than approximately 1 kW, or more than 30 kW or approximately 50 kW, in real time. Further, electric motors with high power can thus be regulated.

Further, the interface can be arranged for receiving a multiple number of measuring signals related to conditions of the object controlled by the power electronics. Thus, in addition to one or a multiple number of measuring signals representing current intensities in windings of the electric machine, other measuring signals may also be connected to the interface, for instance a measuring signal representing the supply voltage of power electronics of the motor, and/or a measuring signal representing the position, the rotational speed and/or the actual torque of the motor. Also, measuring signals relating to operating conditions of the compressor, such as built-up pressure, flow, temperature, vibrations and/or noise, can be supplied to the digital input/output unit. By use of the general-purpose processor, various measuring signals can simply be connected to the processing unit. In addition, optionally, power electronics of different electric machines may be regulated by only one processing unit. Instead of measuring signals representing various physical quantities, the electric machine may also be regulated with the aid of measuring signals representing only electric currents through one or a multiple number of windings of the AC motor. This allows saving on sensors, which yields not only a cost price advantage, but also an increase in reliability. For obtaining a stable regulation, use may, for instance, be made of a mathematical model of the motor.

It is noted that the processing unit according to the invention can be used with electric machines which have either a single winding or a multiple winding, for instance for three-phase supply. Further, the processing unit may be used on an electric machine driving a different device, such as robot actuators, instead of a compressor.

Further advantageous embodiments of the invention are described in the subclaims.

The invention will be explained in more detail with reference to exemplary embodiments shown in the drawing, in which.

The Figures are only schematic representations of the invention and are exclusively given by way of non-limiting examples.

Figure 1:
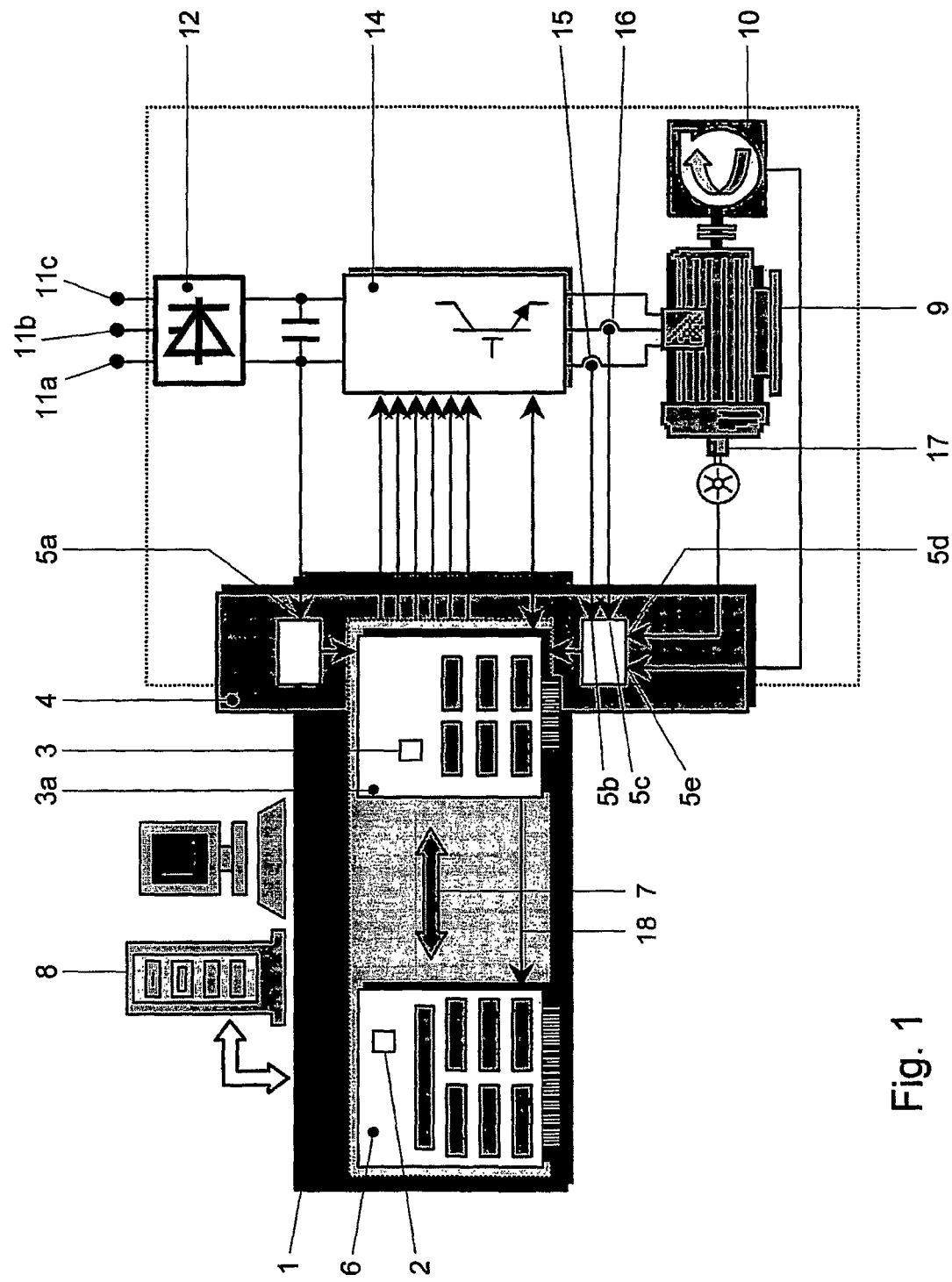
FIG. 1 shows a schematic view of a processing unit according to the invention.

FIG. 1 shows a schematic view of a processing unit 1 according to the invention. The processing unit 1 comprises a calculating unit which is designed as a general-purpose processor 2, also called PC-compatible processor, such as a desktop PC, PC/104, Compact PCI, Industrial PC, PC motherboard and the like. Further, the processing unit 1 comprises an interface which comprises an FPGA 3. Of course, instead of an FPGA 3, the interface may also comprise a different type, for instance a PLD. Further, the interface comprises an A/D converter 4 with a multiple number of connections 5a-5e for sensors. The FPGA 3 is provided on a printed circuit board 3a. The FPGA 3 has digital terminals for communication with the general-purpose processor 2.

The general-purpose processor 2 is mounted on a standard motherboard 6. The FPGA 3 is connected to the processor 2 via a PCI bus, so that a relatively inexpensive and flexible implementation is obtained. Transport of data between the FPGA 3 and the processor 2, indicated symbolically in FIG. 1 by a double arrow 7; can thus be carried out quickly and reliably. Instead of a separate design, the FPGA 3 and the processor 2 may also be integrated on one printed circuit board so that a compact unit is obtained and data transport can potentially be carried out still more quickly and more reliably. Further, the A/D converter 4 can be implemented either integrally with the FPGA 3 on one printed circuit board 3a or separately therefrom, as desired.

However, it is also possible to accommodate both the processor 2 and the FPGA 3 and the A/D converter 4 in a standard PC 8, for instance for downloading source code.

The processing unit 1 regulates the drive of an objected designed as an AC motor 9 which is controlled by power electronics, as will be described in more detail hereinbelow. The AC motor 9 has, for instance, a nominal rotational speed of approximately 80,000 revolutions per minute at, for instance, approximately 500 kW, and drives a compressor 10. The three-phase supply 11a-11c is connected to a rectifier 12. At the outputs of the rectifier 12, a first sensor is disposed which generates a measuring signal representing the DC voltage. Via a connection 5a of the A/D converter 4, the measuring signal is inputted into the processing unit 1. Further, a pulse width modulation (PWM) converter 14 is connected to the outputs of the rectifier 12 via a driver. The PWM converter 14 comprises power electronics for generating, depending on control signals, a high-frequency power voltage which is provided to the windings of the AC motor 9. The power electronics are thus connected to digital outputs of the FPGA 3 via the driver and thus obtain the control signals which are generated by the processing unit 1. The driver may be provided in or to the PWM converter 14. However, it is also possible to accommodate the driver elsewhere, for instance at the output of the A/D converter 4. The outputs of the PWM converter 14 are connected to the windings of the motor 9 via current sensors 15, 16, for instance Hall sensors or sensors with a shunt. The current sensors 15, 16 are connected to the A/D converter 14 via terminals 5b, 5c for processing measuring signals, namely of electric currents, which are related to operating conditions of the electric machine. Further, optionally, on the shaft of the motor 9, sensors 17 are provided for measuring other operating conditions, such as the shaft position and/or rotational speed of the motor. In addition, optionally, sensors are provided in and/or to the turbine 10 for carrying out measurements on, for instance, built-up pressure, flow, temperature, vibrations and/or noise in the turbine. The sensors 17 on the shaft of the motor 9 and in and/or to the turbine 10 are connected to the A/D converter 4 via terminals 5d, 5e.

By use of the A/D converter 4, the measuring signals generated by the sensors can be represented at discrete levels, so that a digital signal is obtained after sampling. The digital signals are transported to the processor 2 via communication channels 7 in the printed circuit board 6. Since the general-purpose processor 2 is provided with a real-time control system, real-time processing steps can be carried out on the digitized measuring signals. Depending on the digitized measuring signals, the processor 2 generates a control signal The control signal is then transmitted to the power electronics of the PWM converter 14 via the FPGA 3.

Figure 2:
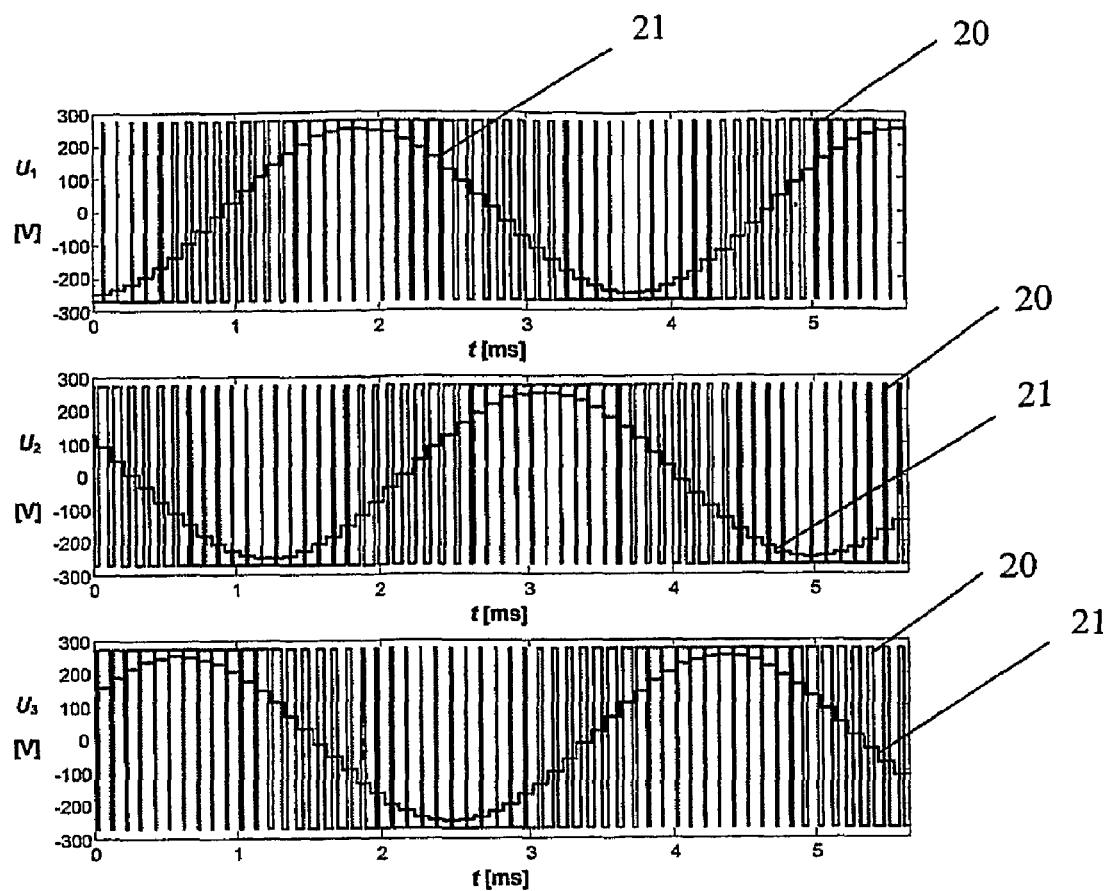
FIG. 2 shows a graphic representation of a control signal according to the invention.

FIG. 2 shows a number of graphic representations of control signals 20 for a three-phase motor where the voltage $u_1$, $u_2$ and $u_3$, expressed in voltage V is shown as a function of time, expressed in milliseconds ms. The Figures thus show the signals for, successively, phase 1, phase 2 and phase 3 of the electric motor 9. The control signal 20 is a pulse width-modulated signal and represents the control voltage supplied to the circuit of the electric motor. The time average of the pulse width-modulated signal is the desired reference voltage 21 which is calculated by the processor 2. Due to the inductive character of the electric motor, only the time-average value of the control signal 20 is followed, while higher time-harmonic components are filtered out.

Figure 3:
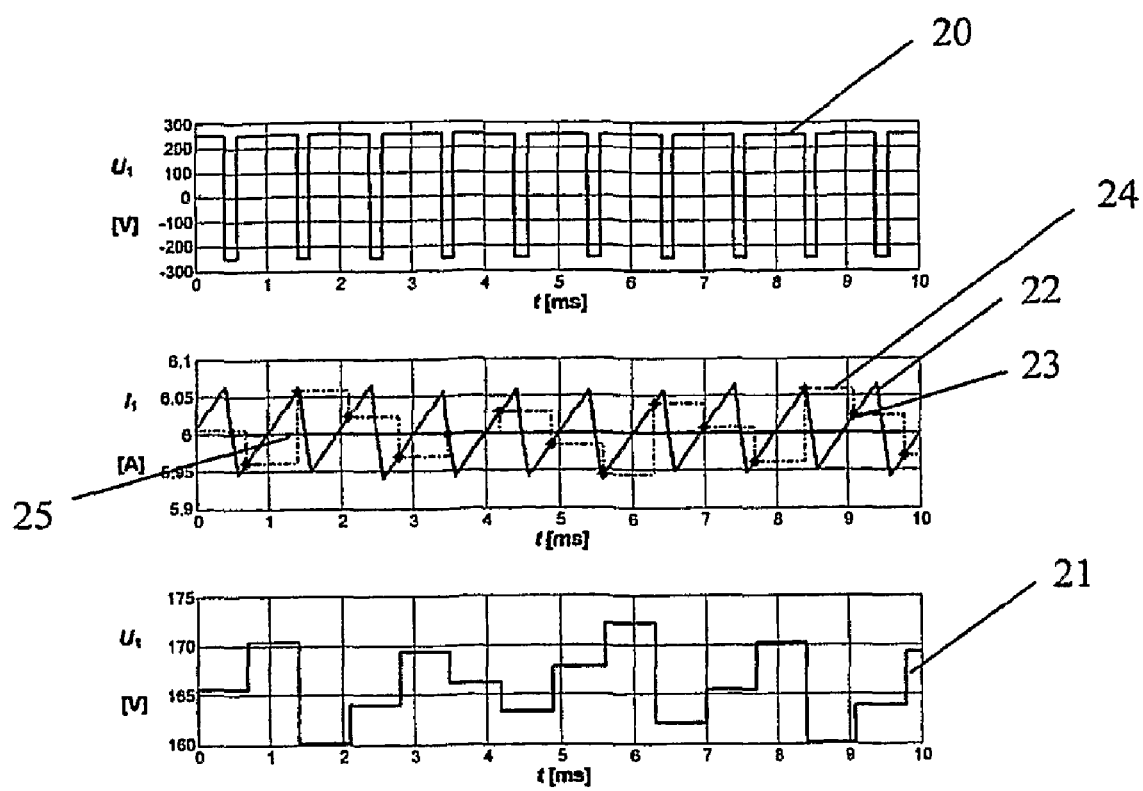
FIG. 3 shows a number of signals occurring in the processing unit of FIG. 1.

FIG. 3 shows a number of signals in more detail. For the sake of simplicity, it has been chosen to show signals which relate to an electric DC motor in FIGS. 3 and 4. In the case of an AC motor, the behavior of the signals is similar. Thus, in the top graph, the control signal ($U_1$) 20 is shown. This signal is symmetrically pulse width-modulated, so that the signal assumes a high value around the center of the pulse code period. Of course, it is also possible to design the modulation differently, for instance asymmetrically. Since the electric motor behaves inductively, the electric current in the winding increases, substantially linearly, when the control voltage is positive, and the electric current decreases when the control voltage is negative. This is shown in the center graph of FIG. 3. Here, the electric current 22 is indicated as $I_1$. The electric current 22 substantially has a sawtooth-shaped profile which is superposed on a constant value, namely in the case of a DC motor, or on a harmonic signal, namely in the case of a motor which is driven by an AC voltage.

In a first embodiment, sampling was done at times 23 indicated by a bold dot in the center graph of FIG. 3. The values of the electric current measured at the sampling times 23 vary slightly as a result of the sawtooth-shaped profile of the electric current 22. Here, for the calculation of a control signal 21 in the pulse code period following the period in which the electric current 22 was measured, always a constant value 24 of the electric current 22 is assumed. So, this constant value 24 jumps as a result of the random sampling times in the pulse code period. Since the average of the electric current 22 within a pulse code period is virtually constant, a virtually constant reference current 25 would result in practically the same motor behavior. In the present embodiment, the reference voltage 21 will correct for the slightly erratic behavior of the electric current 24 assumed to be constant within a pulse code period. The correcting reference voltage 21 is shown in the bottom graph of FIG. 3, shown as $U_{ref}$.

Figure 4:
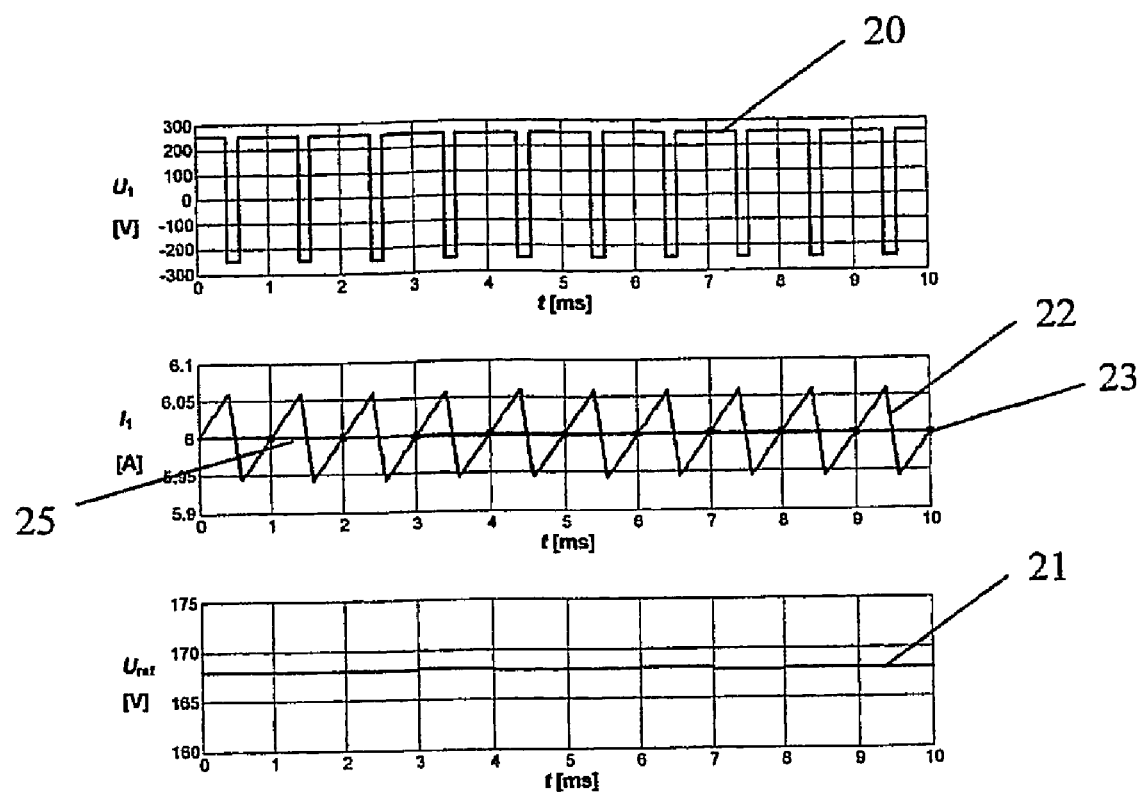
FIG. 4 also shows a number of signals occurring in the processing unit of FIG. 1.

In a second embodiment, the sampling time of the electric current 22 is synchronized with the control signal 20, and such that the electric current 22 is measured in the center of the pulse code period. Since the control signal 20 is symmetric, the electric current 22 in the center of the pulse code period is equal to the fundamental current value. By sampling at above-mentioned time, superharmonic components of the electric current 22 are filtered out, so that the regulation becomes more stable. This is shown in FIG. 4, where the three graphs show the same signals as in FIG. 3. It is clearly visible that the sampled electric current 23 is virtually constant and coincides with the virtually constant reference current 25. Consequently, the correcting control voltage 21 is also practically constant, which prevents frequency fluctuations in the rotational speed of the motor 9 and excessive motor loss due to heating. For realizing the synchronous sampling, the clock of the processor is regulated by the FPGA with the aid of an interrupt connection 18.

It is noted that the power consumed by the processor 2 is negligible with use of compressors 10 with relatively great power. In order to obtain a great reliability of the processing unit 1, a part of the time-critical functionality is implemented in the FPGA 3.

The invention is not limited to the above-described exemplary embodiment. Many variants are possible.

Thus, the processing unit may be arranged for processing a measuring signal which is, instead of being connected to power electronics of an electric machine, connected to power electronics of an active front end of an inverter for reducing the harmonic content of the electric control, or of a magnetic bearing system of a compressor.

Further, a multiple number of FPGAs can be used instead of only one FPGA. Also, instead of an AC motor, a DC motor can be used. In addition, it is possible to arrange the processing unit for processing measuring signals related to power electronics of a multiple number of electric machines.

Such variants will be clear to a skilled person and are understood to be within the scope of the invention as set forth in the following claims.

The invention claimed is:

1. A processing unit for processing a measuring signal related to conditions of an object controlled by power electronics, comprising:
   an interface with digital terminals, wherein the interface is provided with at least one terminal for a sensor which generates the measuring signal; and
   a calculating unit to which the interface is connected, wherein the calculating unit is equipped with a real-time control system and wherein the calculating unit comprises a general-purpose processor and wherein the objected controlled by the power electronics comprises an electric machine, and wherein the processing unit is arranged for calculating, depending on the sampled measuring signal representing the electric current through a winding of the electric machine, a control signal for regulating the object controlled by the power electronics, and wherein the control signal is synchronized with the sampling time of the electric current.

2. The processing unit according to claim 1, wherein the electric machine has a high nominal power.

3. The processing unit according to claim 2, wherein the electric machine comprises an AC motor which operatively drives a compressor.

4. The processing unit according to claim 1, wherein the interface is provided with a terminal for transmitting the control signal to switching means of the power electronics.

5. The processing unit according to claim 1, wherein the interface is arranged for receiving a multiple number of measuring signals which are related to conditions of the object controlled by the power electronics.

6. The processing unit according to claim 1, wherein the processing unit is arranged for generating, depending on measuring signals, a control signal which represents only electric currents through one or a multiple number of windings of an electric machine.

7. The processing unit according to claim 1, wherein the general-purpose processor is synchronized with a sampling processing of the measuring signal.

8. The processing unit according to claim 1, wherein the interface comprises at least one digital input/output unit and at least one analogous/digital converter.

9. The processing unit according to claim 8, wherein the digital input/output unit comprises an FPGA.

10. The processing unit according to claim 8, wherein the digital input/output unit is integrated with the calculating unit on one printed circuit board.

* * * * *